Jan. 17, 1939.  W. EWALD  2,144,528
GRILLE AND METHOD OF MAKING SAME
Filed July 24, 1936  2 Sheets-Sheet 1

Inventor
Warren Ewald
BY A.S.Krotz
Attorney

Jan. 17, 1939.                W. EWALD                2,144,528
                   GRILLE AND METHOD OF MAKING SAME
                 Filed July 24, 1936         2 Sheets-Sheet 2

Inventor
Warren Ewald
By A.S.Krotz
    Attorney

Patented Jan. 17, 1939

2,144,528

UNITED STATES PATENT OFFICE 2,144,528

GRILLE AND METHOD OF MAKING SAME

Warren Ewald, Racine, Wis., assignor to Young Radiator Company, Racine, Wis.

Application July 24, 1936, Serial No. 92,275

7 Claims. (Cl. 29—160)

My invention relates to improvements in grilles suitable for air inlets and air outlets. The objects of my invention are, first, to provide a grille which is made by slitting and bending a flat sheet without loss of material and without the addition of parts, bolts or bonding; second, to reduce the air resistance to a minimum; third, to provide a grille which is pleasing in appearance and wherein the grille fins may be inclined at any desired angle so as to direct the air sidewise or whereby the air may be variously directed; fourth, to reduce the cost and weight of a grille to a minimum; fifth, to provide a grille that may be easily attached to a suitable frame; and sixth, to provide a grille wherein the fins may be given a tear drop shape without changing the blanked sheet from which the other grilles are formed.

I attain these and other objects in a manner as hereinafter set forth and claimed and shown in the accompanying drawings in which—

Figure 10:
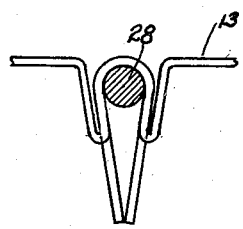

Fig. 10 is a fractional end view of a modification.

Figure 11:
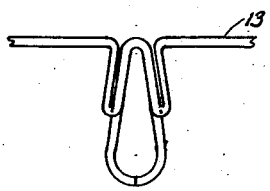

Fig. 11 is a fractional end view of another modification.

As thus illustrated my improved grille comprises fins 12 and connecting members 13; these members, before forming are designated in Figure 8 by reference characters 12ª and 13ª, from which they are formed as will hereinafter appear.

Figure 8:
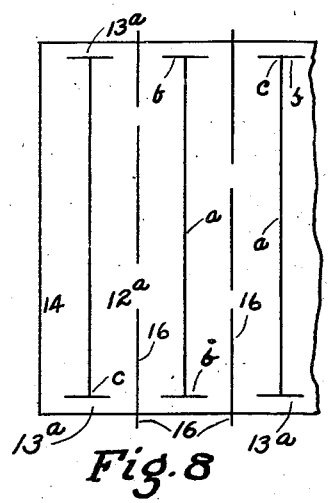
Fig. 8 is a fractional plan view of a sheet before the forming operation, illustrating the necessary cuts or slits with which to form a grille as illustrated in the various figures.

My improved fin is formed from a blank sheet of the desired length and width, as illustrated in Figure 8, having spaced slits a and transverse slits b which preferably intersect the ends of a at their centers as at c.

Figure 1:
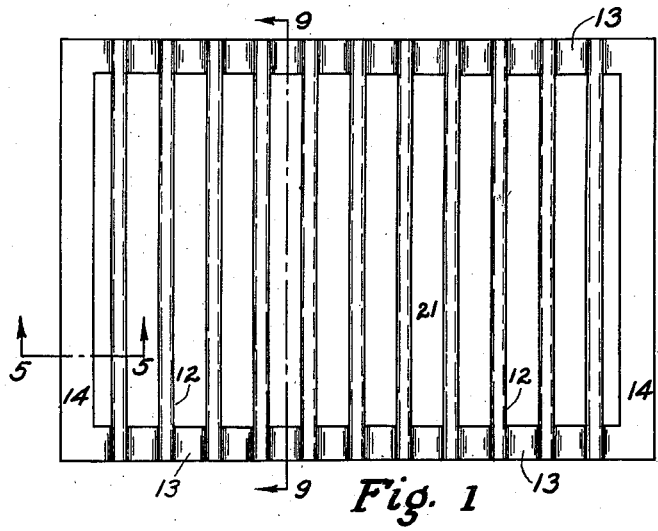
Fig. 1 is a front elevation of my improved grille.
Figure 2:
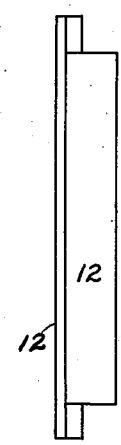
Fig. 2 is an end view of my device as illustrated in Figure 1.
Figure 3:
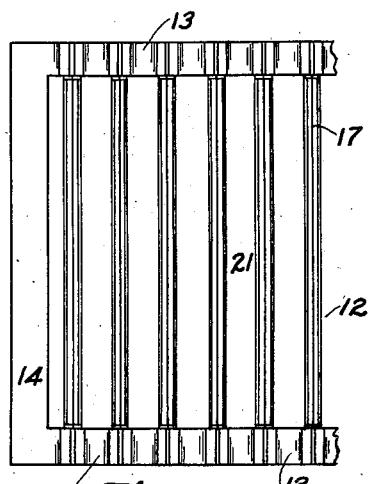
Fig. 3 is a fractional rear view of the grille as illustrated in Figure 1.
Figure 4:
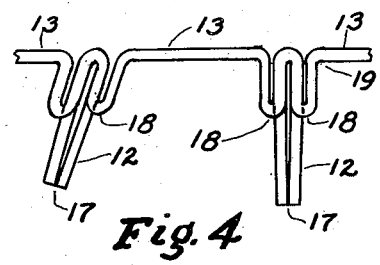
Fig. 4 is a fractional end view of my device, one fin being inclined at an angle to the normal direction of air flow.
Figure 7:
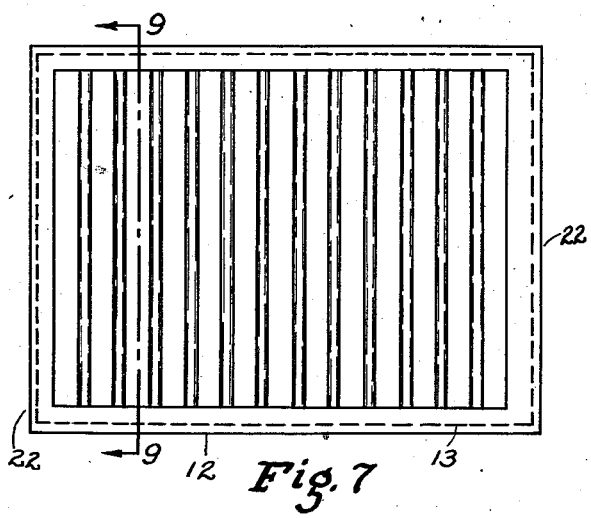
Fig. 7 is a front elevation of my grille as attached to a frame.

When desired, end members 14 may be provided as illustrated in Figures 1, 3, and 7. Figure 4 illustrates the fins and connecting members somewhat enlarged, one fin differing from the others only in that it and the folds are inclined at an angle, thus to indicate that after or at the time the grille is formed, the fins may be inclined at any desired angle, at varying angles or in groups of different angles.

Figure 5:
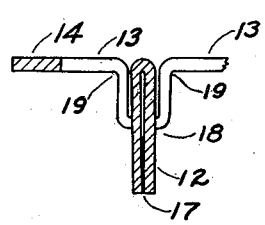
Fig. 5 is a fractional section taken on line 5—5 of Figure 1.

Referring now specifically to Figures 4, 5 and 8; members 12ª are preferably folded on a line as at 16, the edges of the fins thus formed meeting as at 17. Members 13ª, however, are folded back in the opposite direction as at 18 and bent out at right angle as at 19 (see Figure 5); the remaining portions of 13ª, designated by numeral 13, then act as spacers, as clearly illustrated in Figures 1 and 3.

Obviously the fins may be variously spaced by changing the length of strips 13ª; for example, the fins may be spaced further apart by simply extending or lengthening the slits b and the fins may be spaced closer by shortening the slits b; or the folds may be lengthened without changing the slits b, to thereby reduce the space between fins.

Thus it will be seen that there is no waste material, the folds acting as a support to hold the fins in their desired position and the space 21 between fins representing the fin material less the portion of member 13ª used in the two folds.

Figure 5 illustrates a preferred fin position. This position is also illustrated by the right hand fin in Figure 4, and the left hand fin in Figure 4 illustrates how easily the fins may be inclined; clearly, the fin may be curved longitudinally in order to direct the air current at whatever angle is desired.

Referring now to Figures 10 and 11, it will be seen that the fins may be made tear drop shape in cross section or any other shape desired. Figure 10 is most suitable for air passing in the direction indicated by arrow. Figure 11 illustrates a tear drop fin wherein the grille is used for an air outlet, the air moving in the direction indicated by arrow.

Figure 6:
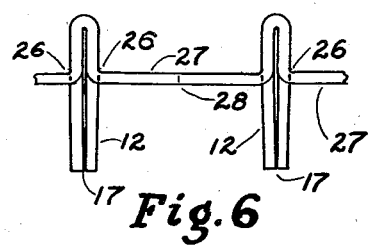
Fig. 6 is a fractional end view of a modification.

Referring now to Figure 6 wherein the ends of strip 13ª are bent at right angles as at 26 so as to form straight connecting members 27 between the fins, as illustrated In this design I may make the fins from separate strips, similar to blanks which would be formed if slits a were extended across members 13ª (see Figure 8); thus member 27 would be made to terminate as at 28 (see Figure 6), the fins being held in spaced relation by being bonded to the holding frame 22; or the connecting members may be made to lap one over the other and being bonded or spot welded together.

When fins are long and additional strength is needed, the blank from which the grille is formed may be made thicker or reinforcing means may be positioned in the fold of the fin; or as illustrated in Figure 10, a wire 28 may be positioned at the inlet side of the fin.

It will be understood that the point where the fin is folded may be moved whereby the fin may be left double for only a part of its width, or slits $b$ may be moved endwise far enough so the ends intersect slits $a$ and all of the bends made across members 13ª, one end only being folded as indicated in Figure 5; thus there will be reinforcing folds on one side only of the fins.

Figure 9:
Fig. 9 is a sectional view of my device taken on line 9—9 of Figure 7.

Thus it will be seen that my improved grille is light, easily manufactured and at low cost, that the fins may be variously inclined and shaped, and that the grille may be easily secured to a frame, one form of which is illustrated in Figures 7 and 9, the frame being designated by numeral 22. In this assembly members 13 and 14 may be spot welded to the rear surface of the frame or otherwise secured thereto.

Having thus shown and described my invention, I claim:

1. A grille of the class described, comprising spaced fins and connecting end members, all being formed from a single sheet, said fins comprising folded portions and said connecting members formed by a reverse fold spaced from said fin fold and having an outward right angle bend adjacent said fin fold whereby said connecting members are on the same plane as the fin fold.

2. A grille of the class described, comprising fins and end connecting members each formed from a single sheet, said fins comprising folded portions and said connecting members comprising strips having a return fold a distance from the folded ends of said fins and an outward bend adjacent the fin fold forming a connecting member between said outward bends and positioned on the same plane as said fin fold.

3. A grille of the class described, comprising spaced fins and narrow connecting end members all being formed from a single sheet, said fins comprising folded portions and said connecting members formed by a reverse fold spaced from said fin fold and an outward right angle bend adjacent said fin fold whereby said connecting members are on the same plane as said fin fold.

4. A method of forming a grille of the class described, consisting first of cutting a number of spaced parallel slits through an elongated sheet of metal to within a short distance of the sides thereof and cutting short spaced slits through said sheet which intersect the ends of said first slits transversely, forming short narrow strips along said sides, folding the uncut portions of said sheet parallel to said first slits for the entire width of the sheet and folding said strips at their ends in the opposite direction to said first folds and bending said narrow strips outwardly adjacent said first folds.

5. A method of forming a grille of the class described, consisting first of cutting a number of spaced parallel slits through a rectangular sheet of metal to within a short distance of the sides thereof and cutting short spaced slits through said sheet which intersect the ends of said first slits transversely forming short narrow strips along said sides, next folding the uncut portions of said sheet parallel to said first slits for the entire width of said sheet and bending said strips outwardly at their ends.

6. A grille fin of the class described, comprising a rectangular strip of material bent double longitudinally and having narrow transverse strips at its ends cut free from the corners thereof; the inner ends spaced and being left intact and bent outwardly thereat, to thereby form supporting feet on opposite sides of said strip and being on the same plane and positioned a distance from the bent edge of said strip.

7. A grille of the class described, comprising a number of spaced fins having narrow end connecting members all being formed from a single sheet without removing material, said fins comprising portions folded double longitudinally the free edges contacting, said connecting members comprising relatively narrow strips being bent outwardly at a point a distance from the folded edge of the fins and intermediate the front and rear edges thereof to thereby form a medial connection between fins and provide a transverse seating surface on the sides of the strips opposite the folded edges of said fins.

WARREN EWALD.